Patented Nov. 28, 1950

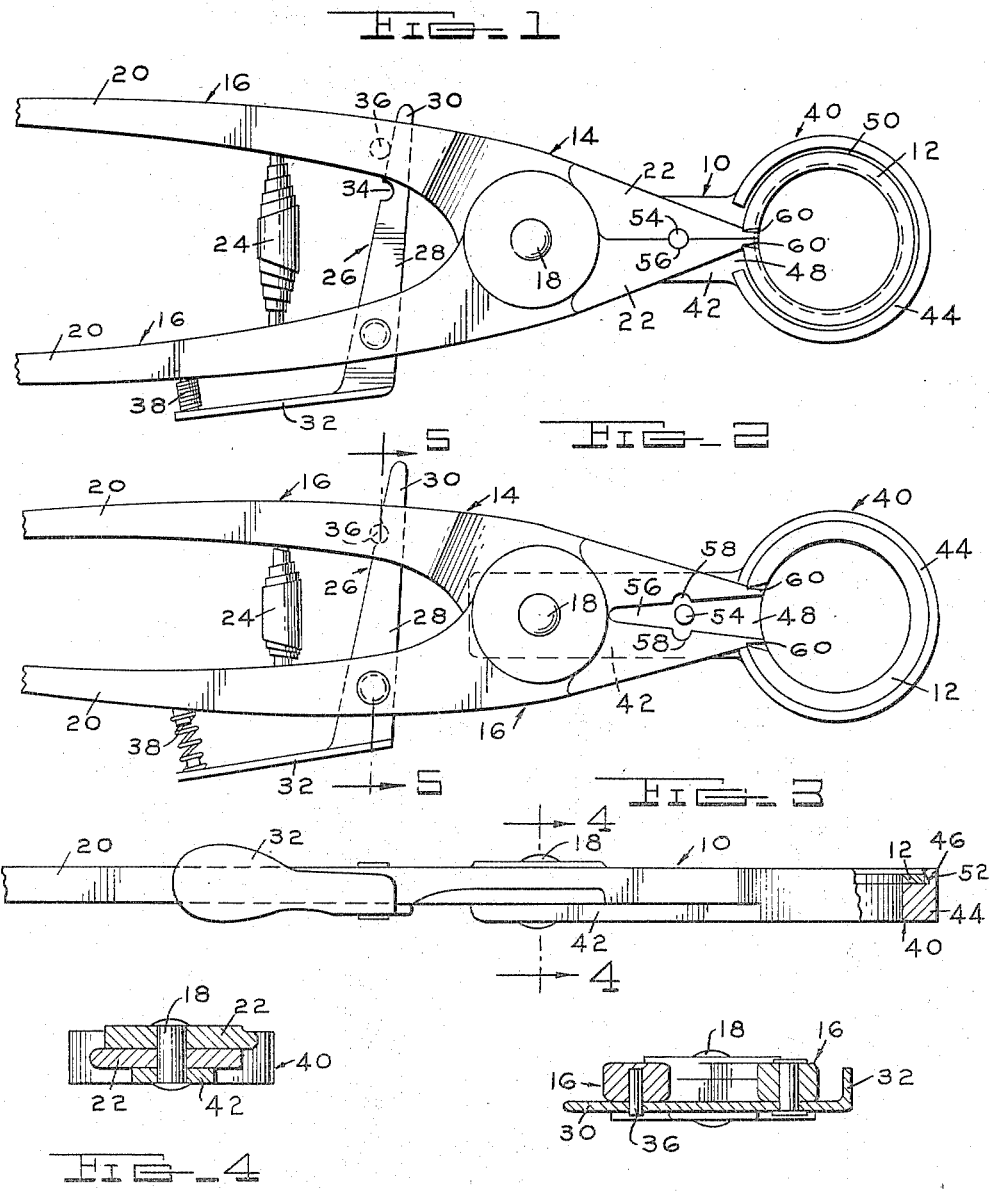

2,532,141

UNITED STATES PATENT OFFICE 2,532,141

SPLIT RING EXPANDER

Louis R. Barkan and Morris L. Anderson, Massillon, Ohio, assignors to Eaton Manufacturing Company, Cleveland, Ohio, a corporation of Ohio Application July 9, 1947, Serial No. 759,822

3 Claims. (Cl. 29—229)

This invention relates to snap rings and more particularly to a tool for applying said rings to and for removing same from shafts and the like.

Broadly the invention comprehends the provision of tools for inserting or applying resilient snap rings in appropriate grooves in shafts comprising plier means for expanding the rings, lock means for retaining the rings in expanded positions and recess means for preventing over-expansion of the rings as well as retain and prevent same from twisting while in expanded condition.

An object of the invention is the provision of a tool for expanding snap rings in an easy manner for application to shafts and the like.

Another object of the invention is the provision of a tool for readily, easily, and effectively applying snap rings to shafts without injury to the shaft.

Another object of the invention is the provision of a tool for expanding resilient snap rings for application to removal from appropriate shaft grooves while at the same time prevent over-expansion of the rings and either twisting or cocking thereof when in expanded position.

A further object of the invention is the provision of a tool for applying resilient circular snap rings to and removing same from shafts and the like with a minimum of manual pressure.

A yet further object of the invention is the provision of an external type resilient snap ring expanding tool having means incorporated therein for preventing over-expansion of the ring and at the same time provide for equal distribution of stresses therein so as to prevent concentration of stress at a point diametrically opposite the opening in the ring.

A still further object of the invention is the provision of a tool for expanding resilient split rings for insertion upon and removal from retaining grooves therefor of shafts and the like through the application of pressure substantially tangentially to the ring circumference and having means incorporated therein for locking the tool when the ring is of a predetermined expanded size and means for releasing same as desired.

Other objects and advantages of the invention will appear from the following description taken in connection with the drawings forming a part of the specification; and in which:

Fig. 1 is a top plan view of a snap ring expanding tool with a snap ring therein in non-expanded state;

Fig. 2 is a top plan of the snap ring expanding tool shown by Fig. 1 with the ring in expanded state therein;

Fig. 3 is a side plan view of the tool partly in section;

Fig. 4 is a cross section view taken through lines 4—4 of Fig. 3; and

Fig. 5 is a cross section view taken through lines 5—5 of Fig. 2.

It has been the customary practice prior to the development of the tool described and claimed by co-pending application entitled "Expanding Implement," Ser. No. 651,823, filed March 4, 1946, to apply resilient snap rings to shafts without providing means for preventing over-expansion of the ring or twisting or cocking thereof when in expanded position.

It is the premise of the present invention to provide a tool of the class defined by U. S. application Serial No. 651,823 embodying distinct improvements thereover and which is capable of quickly, easily, effectively, and safely applying expanded resilient snap rings to shafts while simultaneously preventing over expansion, stress concentration and twisting of the rings thereby minimizing any possibility of injury to the shaft in the application of the rings thereupon. This tool is simple to operate in that it embodies a conventional type of expanding plier having a high ratio leverage requiring low manual pressure for expanding the ring to the required size for application upon shafts and the like and means for locking the pliers during maximum expanded state of the ring for ease in handling the tool and ring during the actual application of the tool to appropriate grooves provided in members adapted to receive same. The ring is inserted into its receiving groove, after the tool is moved to application position, by releasing the locking means and permitting contraction of the ring into the groove. The tool is adaptable to remove the ring from its applied position in a like manner as applied.

Referring to the drawings for more specific details of the invention, 10 represents generally a tool for expanding a resilient snap ring such as illustrated by 12 for applying and removing the ring from appropriate grooves in shafts and the like adapted to employ external snap rings for axial holding of members associated with the shafts.

The tool 10 comprises a conventional type of expanding pliers 14 including a pair of substantially like members 16 pivotally connected together by a pin 18 for relative swinging movement toward and away from each other. The members 16 each include handle portions 20 and nose portions 22, the purpose of which will hereinafter appear. A compressing spring 24 arranged intermediate the handles 20 normally holds the handles apart and the nose portions 22 of the pliers in closed relation.

A locking means 26 is provided for the pliers adapted to hold the nose portions 22 of the pliers apart, when the handles are pressed together a predetermined amount, against the resistance of spring 24. The means 26 includes a lever 28 having a part 30 and another part 32 extended substantially at right angles to one another and being pivoted upon one of the handles 20 of the pliers near the junction of the two parts.

The part 30 of the lever extends across the handles of the pliers and is notched 34 at its free end adapted to cooperate with a locking pin 36 arranged on one of the handles opposite from that upon which the lever is pivoted, the purpose of which will hereinafter appear. The part 32 of the lever serves as a release means for the locking means and extends substantially parallel to the handle upon which the lever is pivoted so as to be easily actuated as required and is normally biased away from the handle by a spring 38 interposed between the handle and free end of part 32. The spring 38 acts to load lever 28 in such a manner that upon movement of the handles from the position shown by Fig. 1 to that shown by Fig. 2, the notch 34 automatically engages pin 36 and operates to hold the pliers in expanded position. Although it is preferable to provide only one notch 34 as a positive predetermined expansion position of snap rings handled it may be necessary and advisable to provide a plurality of notches 34 arranged in close array to account for variations in the manufacture of said snap rings relative to the circumferential length of the metal.

The pliers 14 are associated with an arcuate ring holder 40 which is fixedly secured to the pin 18 upon which the pliers are pivoted. The holder 40 includes a flat portion 42 to which the pin is secured extending in a direction with the length of the pliers and a ring portion 44 integral therewith disposed beyond the free end of the nose portions of the pliers having an axially extended circumferential rib 46 thereon. An arcuate portion of the rib is broken away to form an opening 48 through which the nose portions of the pliers extend and in which they are movable a predetermined extent. The rib 46 provides in conjunction with the ring 44 a circumferential groove or recess 50 having a slightly tapered wall 52, said groove being adapted to receive a split resilient snap ring therein.

The portion 42 of the ring holder has a pin 54 fixedly secured on the face 56 thereof adapted to be engaged by notches 58 in the nose portions of the pliers for centering the nose portions thereof when in contacted position as shown by Fig. 1 relative to the opening in the rib portion of the holder.

The extreme ends of the plier nose portions are provided with ring gripping notched portions 60 adapted to register with the open ends of the snap ring 12.

In a normal use of the tool the split resilient snap ring 12 is inserted into groove 50 with its open end in the opening of rib 46 and with the nose gripping portions of the pliers inserted between the ends of the ring as shown by Fig. 1. In the condition shown by Fig. 1 it is to be noted that the internal diameter of the snap ring is smaller than the opening of the ring holder and its external diameter is smaller than the diameter of the wall 50.

With the ring 12 inserted in the groove the handles 20 are pressed together resulting in expanding the ring into abutting relation against the wall 52, said wall in turn acting to restrain the ring from further expansion thus preventing any over expansion thereof tending to permanently deform the ring. Simultaneously with the snap ring being pressed into engagement with the wall the locking means 26 becomes effective through the action of spring 38 causing the notch 34 on part 30 of the lever to engage the pin 36 and inhibit collapsing of the pliers and snap ring when in expanded position. It is to be noted by Fig. 3 that the snap ring when in expanded position is restrained from cocking or twisting motion out of groove by the taper of wall 52 serving to clamp the snap ring from moving out of the plane of the pliers and ring holder and also that the internal diameter of the ring assumes a size equal to or larger than the internal diameter of the ring 44 of the ring holder, the purpose of which will hereinafter appear.

Upon the expanding of the snap ring and the locking thereof in expanded position, the snap ring is in readiness to be applied to an appropriate groove in a shaft or the like upon which the ring is to be assembled. The ring 44 is provided appropriately with an opening of a diameter slightly greater than the shaft to which the snap ring 12 is to be applied so that the shaft can be passed into the opening with ease and without injury to the shaft. When the shaft is moved to a position wherein the snap ring coincides radially with the groove in the shaft adapted to receive the ring, the release portion 32 of the lever is pressed moving the notch 34 from engagement with the pin 36 and permitting contraction of the snap ring 12 through the movement of the nose portions of the pliers to contacting position as the handles are biased apart by spring 24. By maintaining a light hand gripping load upon the handles in opposition to the load of spring 24 the snap ring can be eased into its receiving groove and the tool can be slipped out over the shaft. This completes a cycle of use of the tool.

While this invention has been described in connection with certain specific embodiments, the principle involved is susceptible of numerous other applications that will readily occur to persons skilled in the art. The invention, therefore, is limited only as indicated by the scope of the appended claims.

What we claim is:

1. A tool for expanding a resilient split ring comprising a member having a circular opening therethrough, a circumferential inwardly tapered wall recess adjacent the opening and a radial slot connected with the recess, the taper thereof flaring radially outwardly from the face of the recess to the bottom thereof, a pair of substantially identical members pivoted on the first member having notched fingers movable in the slot, adapted to be engageable with the free ends of a ring received in the recess with its split portion in radial alignment with the slot, for expanding the ring into engagement with the circumferential inwardly tapered wall of the recess, means on the first member in line with the pivot axis of the pair of members and opening through the first member engageable by the pair of members for positioning the members relative to one another in their normal stationary position, spring means interposed between the members on the opposite side of their pivot from their notched finger end for normally holding the members against the positioning means, means associated with the pivotal members for locking said members in predetermined expanded position, and means for releasing said locking means.

2. A split ring expander including a plier construction and a ring retainer, said plier construction comprising two levers pivoted intermediate their ends affording handles at one end of the levers and jaws at the other end thereof, said ring retainer comprising an elongated member mounted on the pivot of said pliers and extending towards the ends of said jaws and terminating in the annulus having an upstanding wall provided with a slot to receive the end of said jaws.

3. The structure set forth in claim 2 including a stop on said elongated member intermediate its ends for engaging and centering the elongated member with respect to the jaws of the pliers.

LOUIS R. BARKAN.
MORRIS L. ANDERSON.

REFERENCES CITED

The following references are of record in the file of this patent:

UNITED STATES PATENTS

| Number | Name | Date |
|---|---|---|
| 1,052,982 | Sturtevant et al. | Feb. 11, 1913 |
| 1,079,564 | Komancsek | Nov. 25, 1913 |
| 1,283,620 | Baker | Nov. 5, 1918 |

FOREIGN PATENTS

| Number | Country | Date |
|---|---|---|
| 501,252 | Germany | June 30, 1930 |